United States Patent
Kim

(10) Patent No.: US 9,353,661 B2
(45) Date of Patent: May 31, 2016

(54) METHOD AND SYSTEM FOR ACTIVATING CATALYST OF HYBRID VEHICLE

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/521,129

(22) Filed: Oct. 22, 2014

(65) Prior Publication Data

US 2015/0345353 A1    Dec. 3, 2015

(30) Foreign Application Priority Data

Jun. 3, 2014    (KR) .................. 10-2014-0067626

(51) Int. Cl.
| | | |
|---|---|---|
| B60W 10/00 | (2006.01) | |
| F01N 3/00 | (2006.01) | |
| F02D 3/00 | (2006.01) | |
| F01N 3/20 | (2006.01) | |
| B60W 10/02 | (2006.01) | |
| B60W 10/06 | (2006.01) | |
| B60W 10/08 | (2006.01) | |

(52) U.S. Cl.
CPC ............ *F01N 3/2006* (2013.01); *B60W 10/02* (2013.01); *B60W 10/06* (2013.01); *B60W 10/08* (2013.01); *B60W 2510/30* (2013.01); *B60W 2710/025* (2013.01); *B60W 2710/0666* (2013.01); *B60W 2710/08* (2013.01); *B60W 2710/30* (2013.01); *Y10S 903/93* (2013.01)

(58) Field of Classification Search
USPC ................... 701/22; 477/7–8, 34, 70, 72, 76; 903/902–3
See application file for complete search history.

(56) References Cited

U.S. PATENT DOCUMENTS

| | | | |
|---|---|---|---|
| 6,856,034 B2 | 2/2005 | Peters et al. | |
| 2013/0324363 A1 | 12/2013 | Hashimoto | |
| 2014/0162838 A1* | 6/2014 | Doering ................ | B60W 20/40 477/5 |

FOREIGN PATENT DOCUMENTS

| | | | |
|---|---|---|---|
| JP | 2004-092428 A | 3/2004 | |
| JP | 2008-281021 A | 11/2008 | |
| KR | 10-0921275 B1 | 10/2009 | |
| KR | 10-2011-0139951 A | 12/2011 | |

* cited by examiner

*Primary Examiner* — Yonel Beaulieu
(74) *Attorney, Agent, or Firm* — Mintz Levin Cohn Ferris Glovsky and Popeo, P.C.; Peter F. Corless

(57) ABSTRACT

A method and a system for activating a catalyst of a hybrid vehicle are provided. In particular, the system and the method maintain a speed of a motor to be a predetermined speed when a transmission of the hybrid vehicle is in a neutral state and heat and activate the catalyst by increasing an engine torque through a slip of an engine clutch. The method includes increasing, by a controller, torque of an engine by controlling a slip of an engine clutch disposed between the engine and a motor of the hybrid vehicle. The controller determines whether a temperature of the catalyst of the hybrid vehicle reaches a predetermined temperature and feedback-controls the slip of the engine clutch when the temperature of the catalyst is less than the predetermined temperature.

11 Claims, 2 Drawing Sheets

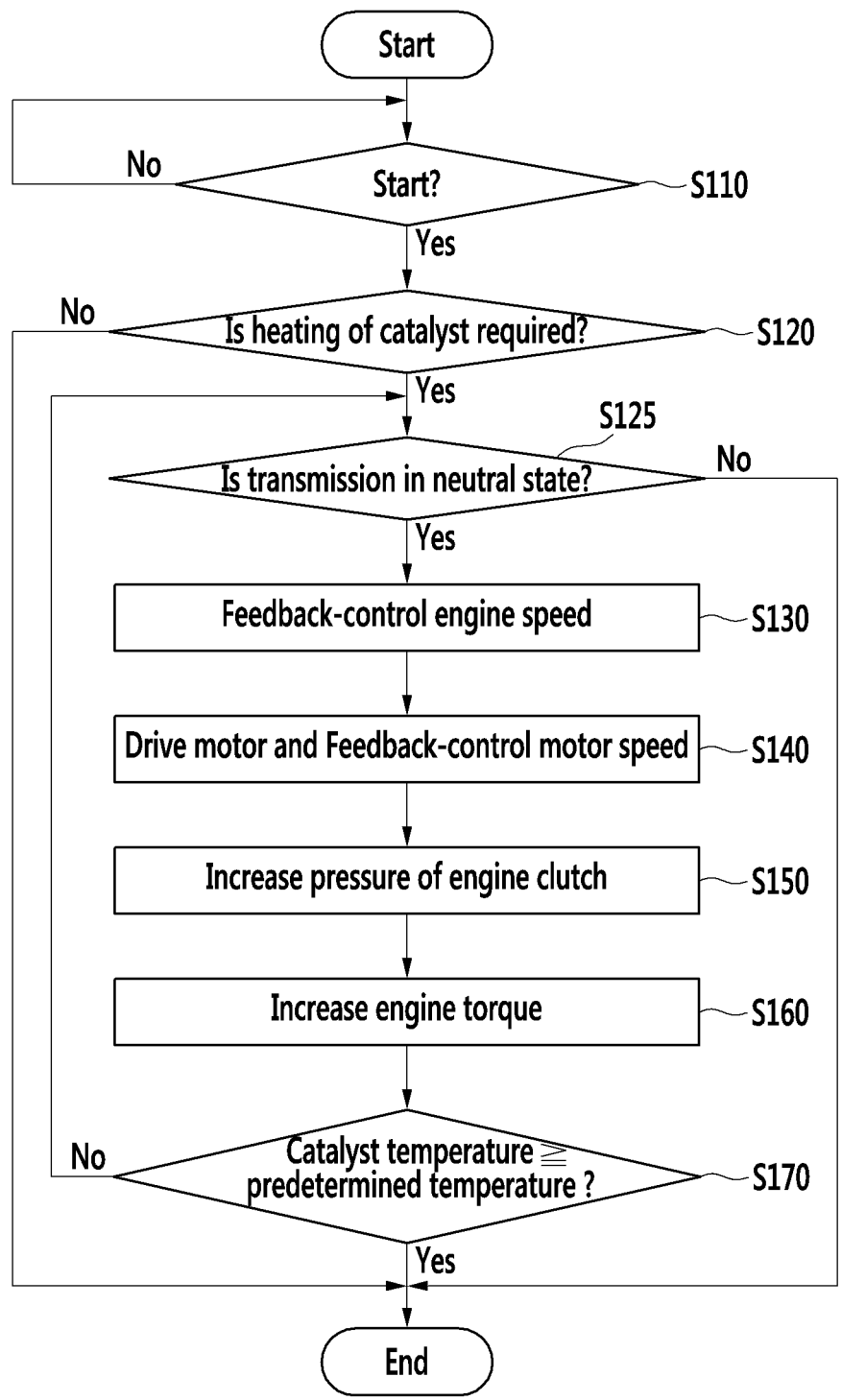

METHOD AND SYSTEM FOR ACTIVATING CATALYST OF HYBRID VEHICLE

CROSS-REFERENCE TO RELATED APPLICATION

This application claims priority to and the benefit of Korean Patent Application No. 10-2014-0067626 filed in the Korean Intellectual Property Office on Jun. 3, 2014, the entire contents of which are incorporated herein by reference.

TECHNICAL FIELD

The present invention relates to a method and a system for activating a catalyst of a hybrid vehicle. The method and the system for activating a catalyst of a hybrid vehicle, in particular, may control a speed of a motor to be maintained at a predetermined speed while a transmission is in a neutral position, and thus the catalyst may be heated and activated by increasing an engine torque through a slip of an engine clutch.

BACKGROUND

Generally, a hybrid vehicle refers to a vehicle in which a motor of an electric vehicle is applied to a conventional internal combustion engine, or a combination of two or more driving sources such as a combination of an internal combustion engine and a fuel cell is applied. Therefore, the hybrid vehicle is an eco-friendly vehicle and has many improved parts in fuel efficiency and performance compared to conventional vehicles.

The hybrid vehicles have been designed by various methods by different manufacturing companies. For example, a transmission mounted electric device (TMED) method in which an electric motor is installed on an automatic transmission may be used, and the hybrid vehicle to which the TMED method is applied has a structure in which an engine clutch is installed between the engine and the (electric) motor to connect or release the engine and the motor.

Recently, as environmental problems have become an issue in the vehicle industry, methods for efficiently processing exhaust gas from the vehicle have been focused. Particularly in the hybrid vehicle, a catalyst may be used to reduce the exhaust gas of the engine during cold start. However, since an activation temperature of the catalyst is significantly greater than room temperature, the catalyst temperature may be elevated by driving the engine and thus the catalyst may be activated.

In the related arts, to solve the above problem, an ignition angle may be sufficiently retarded to decrease kinetic energy and increase heat energy from the energy generated in the engine. However, in this process, vibration may be generated in the engine when the ignition angle is excessively retarded. Moreover, when the engine torque is required, the ignition angle may be retarded sufficiently. Particularly, since the conventional system has a structure in which the engine and a power output shaft are physically coupled with each other and the vibration of the engine may be easily transferred to a driver and output demand torque of the driver together with the engine, the ignition angle may be limited in use for the conventional system. As such, shortening a time for activating the catalyst may not be obtained by increasing the exhaust temperature in the initial stage.

In the related arts, a method of activating the catalyst in the hybrid vehicle has been provided by increasing the catalyst temperature in addition to controlling the retardation of the ignition angle of the engine. For example, a motor of the hybrid vehicle controls a negative (−) torque to be generated and the engine generates additional torque that corresponds to the negative (−) torque of the motor, and thus, heat may be generated by the engine and the catalyst may be activated by the heat. However, as the additional torque is generated in the engine, vibration, noise, and the like may be undesirably generated.

The above information disclosed in this Background section is only for enhancement of understanding of the background of the invention and therefore it may contain information that is not considered as a prior art that is already known in this country to a person of ordinary skill in the art.

SUMMARY OF THE INVENTION

The present invention provides a method and a system of activating a catalyst of a hybrid vehicle that control a speed of a motor to be maintained at a predetermined speed while a transmission is in a neutral position, and heat and activate the catalyst by increasing an engine torque through a slip of an engine clutch.

In an exemplary embodiment, a method of activating a catalyst of a hybrid vehicle may include: increasing torque of an engine by controlling a slip of an engine clutch disposed between the engine and a motor of the hybrid vehicle; determining whether a temperature of the catalyst of the hybrid vehicle reaches a predetermined temperature; and controlling the slip of the engine clutch when the temperature of the catalyst is less than the predetermined temperature.

A pressure of the engine clutch may be increased to increase the torque of the engine. When the hybrid vehicle is started, the catalyst may be heated. In addition, the transmission of the vehicle may be in a neutral state. When the catalyst is heated, a speed of the engine and a speed of the motor may be feedback-controlled, respectively. The speeds of the engine and the motor may be feedback-controlled to increase the pressure of the engine clutch.

In another exemplary embodiment, provided is a system of activating a catalyst of a hybrid vehicle which may include: an engine clutch disposed between an engine and a motor to control connection therebetween; a catalyst temperature detector configured to detect a temperature of the catalyst of the hybrid vehicle; a transmission of the hybrid vehicle; and a controller configured to activate the catalyst of the hybrid vehicle. In particular, the controller may be configured to operate based on the temperature of the catalyst, and states of the engine, the motor, the engine clutch and the like.

In another exemplary embodiment, a controller is provided. The controller may be configured to operate by a predetermined program for performing the method including: increasing torque of an engine by controlling a slip of an engine clutch disposed between the engine and a motor of the hybrid vehicle; determining whether a temperature of the catalyst of the hybrid vehicle reaches a predetermined temperature; and controlling the slip of the engine clutch when the temperature of the catalyst is less than the predetermined temperature.

According to various exemplary embodiments of the present invention, when the transmission of the hybrid vehicle is in a neutral position, the speed of the motor may be maintained at a predetermined speed, and the engine torque may be increased through the slip of the engine clutch. Consequently, the catalyst of the hybrid vehicle may be efficiently heated and activated.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 2 shows an exemplary method of activating a catalyst of a hybrid vehicle according to another exemplary embodiment of the present invention.

Figure 1:
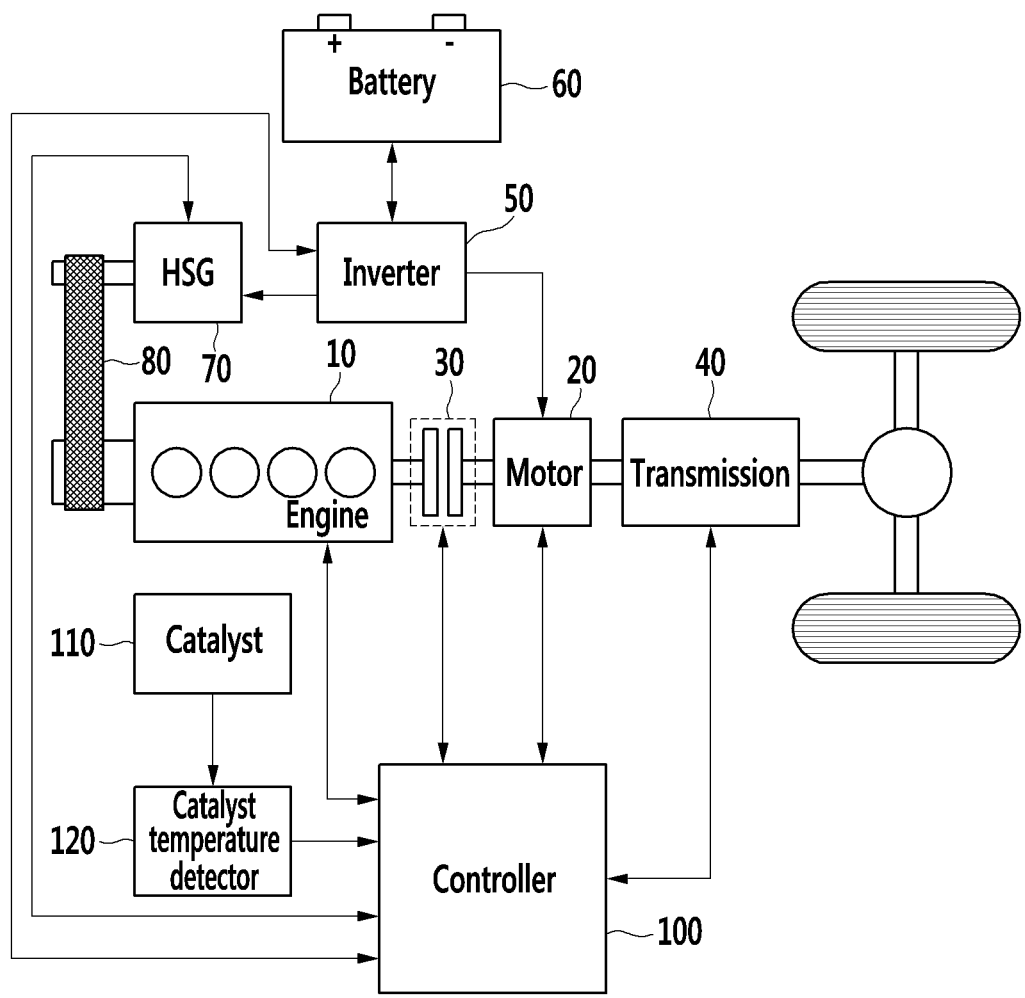
FIG. 1 schematically illustrates an exemplary system for activating a catalyst of a hybrid vehicle according to an exemplary embodiment of the present invention.

Reference numerals set forth in the FIG. 1 include reference to the following elements as further discussed below:

10: Engine
20: Motor
30: Engine clutch
40: Transmission
100: Controller
110: Catalyst
120: Catalyst temperature detector

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the specification, unless explicitly described to the contrary, the word "comprise" and variations such as "comprises" or "comprising," will be understood to imply the inclusion of stated elements but not the exclusion of any other elements. Like reference numerals designate like elements throughout the specification.

In addition, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 schematically illustrates an exemplary system of activating a catalyst of a hybrid vehicle according to an exemplary embodiment of the present invention.

The system of activating a catalyst of a hybrid vehicle according to an exemplary embodiment of the present invention may heat and activate the catalyst through a slip control of an engine clutch which controls a connection between the engine and the motor of the hybrid vehicle. The system of activating the catalyst of the hybrid vehicle may include: an engine clutch 30 disposed between an engine 10 and a motor 20 to control the connection between the engine 10 and the motor 20; a catalyst temperature detector 120 configured to detect a temperature of the catalyst 110 of the hybrid vehicle; a transmission 40 of the hybrid vehicle; and a controller 100 configured to activate the catalyst of the hybrid vehicle based on the temperature of the catalyst 110 and states of the engine 10, the motor 20, and the engine clutch 30.

Further, the system of activating the catalyst of the hybrid vehicle according to the exemplary embodiment of the present invention may include: a battery 60, a starter-generator 70 configured to start the engine 10 or generate power by rotation force of the engine 10; an inverter 50 configured to drive the motor 20 by converting a voltage of the battery 60 according to the control of the controller 100; and a belt 80 configured to connect the engine 10 and the starter-generator 70, as illustrated in FIG. 1. The engine 10, the motor 20, the engine clutch 30, the transmission 40, the inverter 50, the battery 60, the starter-generator 70, the belt 80, the catalyst 110, the catalyst temperature detector 110, and the like may be used as generally described in the art.

In certain exemplary embodiments, the starter-generator 70, as used herein, may be an integrated starter & generator (ISG) or a hybrid starter & generator (HSG). The controller 100 may include one or more microprocessors operating by a predetermined program and/or hardware including the microprocessors, and the predetermined program may be formed by a series of operations of the method of activating the catalyst of the hybrid vehicle according to the exemplary embodiment of the present invention. Further, the controller 100 may be included in a hybrid controller configured to operate the hybrid vehicle, an engine controller configured to operate the engine 10, a motor controller configured to operate the motor 20, or a transmission controller configured to operate the transmission 40. Alternatively, the controller 100 may include the hybrid controller, the engine controller, the motor controller, or the transmission controller. The controller 100 may also be configured to operate the engine 10, the motor 20, the engine clutch 30, the transmission 40, the inverter 50, the battery 60, the starter-generator 70, the belt 80, the catalyst 110, the catalyst temperature detector 110.

In various exemplary embodiments of the present invention providing methods of activating the catalyst of the hybrid vehicle, some processes may be performed by the engine controller, some other processes may be performed by the hybrid controller, and other processes may be performed by the motor controller and the transmission controller. The controller may be implemented by a combination. Alternatively, the engine controller, the hybrid controller, the motor controller, and the transmission controller may perform processes of the combination. The combinations of above components may not be limited to exemplary embodiments disclosed herein.

Hereinafter, methods of activating a catalyst of a hybrid vehicle will be described in detail with reference to the accompanying drawing. It should not be understood that the scope of the present invention is limited as described in an exemplary embodiment to be described below.

FIG. 2 illustrates an exemplary method of activating the catalyst of the hybrid vehicle according to an exemplary embodiment of the present invention. As illustrated in FIG. 2, the controller 100 may be configured to determine whether the hybrid vehicle is started (S110). The controller 100 may be configured to determine the starting state of the hybrid vehicle using any method known in the art, without limitation. For example, the controller 100 may be configured to determine the starting state of the hybrid vehicle through an output signal of the engine controller.

When the hybrid vehicle is started, the controller 100 may be configured to determine whether heating of the catalyst 110 is required (S120). To determine whether the heating of the catalyst 110 is required, for example, the controller 100 may be configured to determine whether a temperature of the catalyst 110 detected by the catalyst temperature detector 120 is at a predetermined temperature or greater. When the detected temperature of the catalyst 110 is less than the predetermined temperature, the controller 100 may be configured to determine that the heating of the catalyst 110 is required. In certain exemplary embodiments, the predetermined temperature set for determining whether the heating of the catalyst 110 is required may be obtained from a design specification of the catalyst 110 and the like.

In step S120, when the heating of the catalyst 110 is required, the controller 100 may be configured to determine whether the transmission 40 is in a neutral position (S125). The controller 100 may be configured to determine the neutral state of the transmission 40 of the hybrid vehicle as generally known in the art. For example, the controller 100 may be configured to determine the neutral state (e.g., position) of the transmission 40 of the hybrid vehicle through an output signal of the transmission controller.

The neutral state of the transmission 40, as used herein, refers to a state in which a driving torque output of the hybrid vehicle is not substantially transferred to a driving shaft, and a state in which the transmission 40 is physically neutralized. When the transmission 40 is in neutral, the controller 100 may be configured to feedback-control a speed of the engine 10 to be maintained at a predetermined speed in the neutral state of the transmission 40 (S130). For example, the controller 100 may be configured to feedback-control the engine 10 to be maintained continuously at a predetermined speed when the transmission 40 is in neutral. Any technique of controlling the speed of the engine to be uniformly maintained may be used without limitation.

While feedback-controlling the speed of the engine 10, the controller 100 may be configured to feedback-control a rotation speed by driving the motor 20 (S140). Since the transmission 40 is physically in the neutral state, the rotation speed may be feedback-controlled by driving the motor 20. In other words, even though the speed may be feedback-controlled by driving the motor 20, when the transmission 40 is physically in the neutral state, the hybrid vehicle may not move and may maintain a stop state. In particular, when the controller 100 feedback-controls the speed of the motor 20, the controller 100 may be configured to adjust the speed of the motor 20 to be at a lower speed than the speed of the engine 10. In other words, when the controller 100 performs a slip-control by applying pressure of the engine clutch 30 while feedback-controlling the engine 10 and the motor 20, the torque of the engine clutch 30 may be applied to the engine 10 as a negative (−) load.

In addition, while performing steps S130 and S140, the controller 100 may be configured to increase the pressure of the engine clutch 30 to increase heat generated from the engine 10 by increasing the torque of the engine 10 (S150).

When the pressure of the engine clutch 30 is increased, the engine clutch 30 and/or the motor 20 may be applied to the engine 10 as the load in proportion to the pressure of the engine clutch 30. Consequently, the engine 10 may generate substantial torque according to the load. In other words, the controller 100 may be configured to increase the torque of the engine 10 to generate substantial torque according to the load (S160).

When the pressure is applied to the engine clutch 30, if the torque applied to the engine clutch 30 is a [T_clutch], torque which needs to be output by the engine 10 to maintain a predetermined target speed may be proportional to the [T_clutch]. When speed feedback control torque, a [T_eng_speed_control], of the engine 10 is considered, the torque, a [T_eng] which needs to be output by the engine 10 may be the same as the following Equation.

$$[T\_eng]=[T\_eng\_speed\_control]+[T\_clutch]$$

When the engine 10 outputs the torque [T_eng] of above Equation according to the control of the controller 100, the motor 20 may be operated to output the torque, a [T_mot], as the following Equation. In Equation below, a [T_mot_speed_control] is speed feedback control torque of the motor 20.

$$[T\_mot]=[T\_mot\_speed\_control]-[T\_clutch]$$

Finally, the torque [T_eng] of the engine 10 may increase in proportion to the magnitude of the pressure of the engine clutch 30, that is, the torque of the engine 10 may increase through the slip control of the engine clutch 30, and as consequence, the catalyst 110 may be heated. Accordingly, when the torque of the engine 10 is increased through the pressure control of the engine clutch 30, the controller 100 may be configured to compare the temperature of the catalyst 110 detected by the catalyst temperature detector 120 with a predetermined temperature (S170).

When the detected catalyst temperature is about the predetermined temperature or greater, the catalyst 110 may be heated through the pressure control of the engine clutch 30 to become a state that may serve as the catalyst. Subsequently, the controller 100 may be configured to stop the process of activating the catalyst of the hybrid vehicle of the present invention. When the detected catalyst temperature is less than the predetermined temperature, the controller 100 may repeat the processes after step S125 as described above.

Accordingly, according to various exemplary embodiment of the present invention, when the transmission is in the physically neutral state, the controller may be configured to feedback-control the speed of the motor to be maintained at a predetermined speed, and the engine torque may be increased through the slip of the engine clutch. As consequence, the catalyst may be efficiently heated and activated.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method of activating a catalyst of a hybrid vehicle, comprising:

increasing, by a controller, torque of an engine by controlling a slip of an engine clutch disposed between the engine and a motor of the hybrid vehicle, wherein a pressure of the engine clutch is increased to increase the torque of the engine when a transmission of the hybrid vehicle is in a neutral state;

determining, by the controller, whether a temperature of the catalyst of the hybrid vehicle reaches a predetermined temperature; and feedback-controlling, by the controller, the slip of the engine clutch when the temperature of the catalyst is less than the predetermined temperature.

2. The method of claim 1, wherein when the hybrid vehicle is started, the catalyst is heated.

3. The method of claim 2, wherein a speed of the engine and a speed of the motor are feedback-controlled, respectively, by the controller.

4. The method of claim 3, wherein the speeds of the engine and the motor are feedback-controlled by the controller to increase the pressure of the engine clutch.

5. A system of activating a catalyst of a hybrid vehicle which is driven by power of an engine and a motor, comprising:

an engine clutch disposed between the engine and the motor and configured to control connection therebetween;

a catalyst temperature detector configured to detect a temperature of the catalyst of the hybrid vehicle;

a transmission configured to perform transmission of the hybrid vehicle; and a controller configured to activate the catalyst of the hybrid vehicle, wherein the controller operates based on the temperature of the catalyst, and states of the engine, the motor, and the engine clutch, wherein the controller is operable to:

increase torque of the engine by controlling a slip of the engine clutch disposed between the engine and the motor of the hybrid vehicle, wherein a pressure of the engine clutch is increased to increase the torque of the engine when the transmission of the hybrid vehicle is in a neutral state;

determine whether the temperature of the catalyst of the hybrid vehicle reaches a predetermined temperature; and feedback-control the slip of the engine clutch when the temperature of the catalyst is less than the predetermined temperature.

6. The system of claim 5, further comprising: a battery.

7. The system of claim 5, further comprising: a starter-generator configured to start the engine or generate power by rotation force of the engine.

8. The system of claim 6, further comprising: an inverter configured to drive the motor by converting a voltage of the battery.

9. The system of claim 7, further comprising: a belt configured to connect the engine and the starter-generator.

10. A non-transitory computer readable medium containing program instructions executed by a controller, the computer readable medium comprising:

program instructions that increase torque of an engine by controlling a slip of an engine clutch disposed between the engine and a motor of the hybrid vehicle, wherein a pressure of the engine clutch is increased to increase the torque of the engine when a transmission of the hybrid vehicle is in a neutral state;

program instructions that determine whether a temperature of the catalyst of the hybrid vehicle reaches a predetermined temperature; and program instructions that feedback-control the slip of the engine clutch when the temperature of the catalyst is less than the predetermined temperature.

11. The non-transitory computer readable medium of claim 10, wherein when the hybrid vehicle is started, the catalyst is heated.

\* \* \* \* \*